Dec. 16, 1952 — L. J. SMITH — 2,621,856
FIRING UNIT CONTROL FOR HEATING SYSTEMS
Filed Dec. 22, 1947 — 8 Sheets-Sheet 1
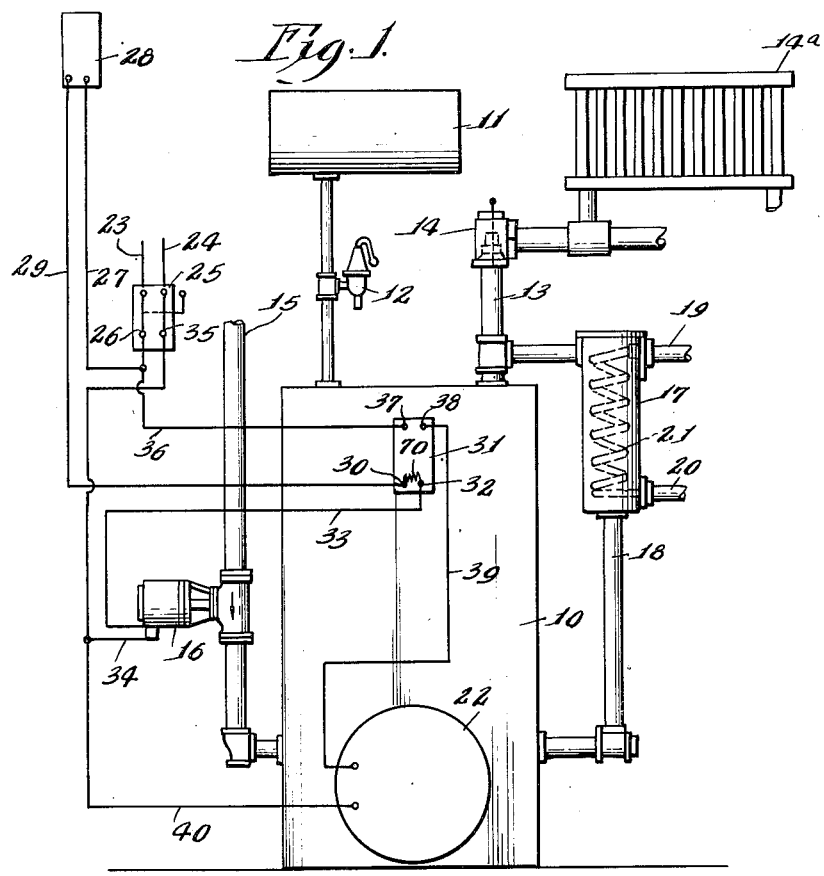
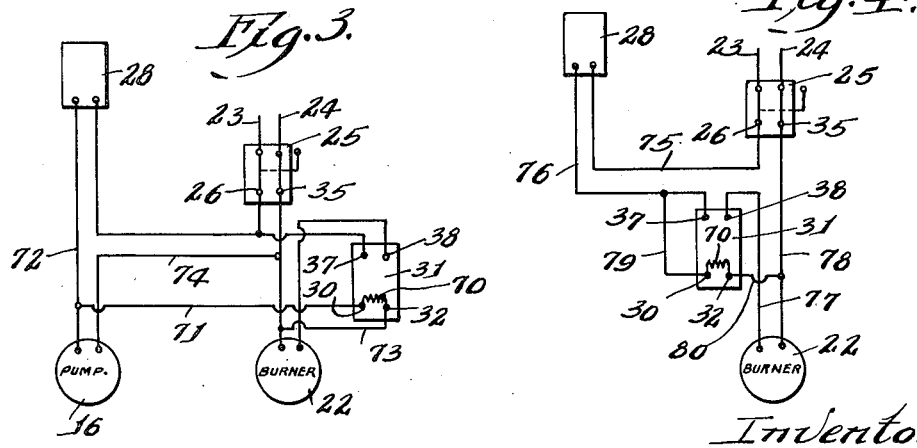
Inventor:
Lawrence J. Smith.
By James Darley
Attorney.

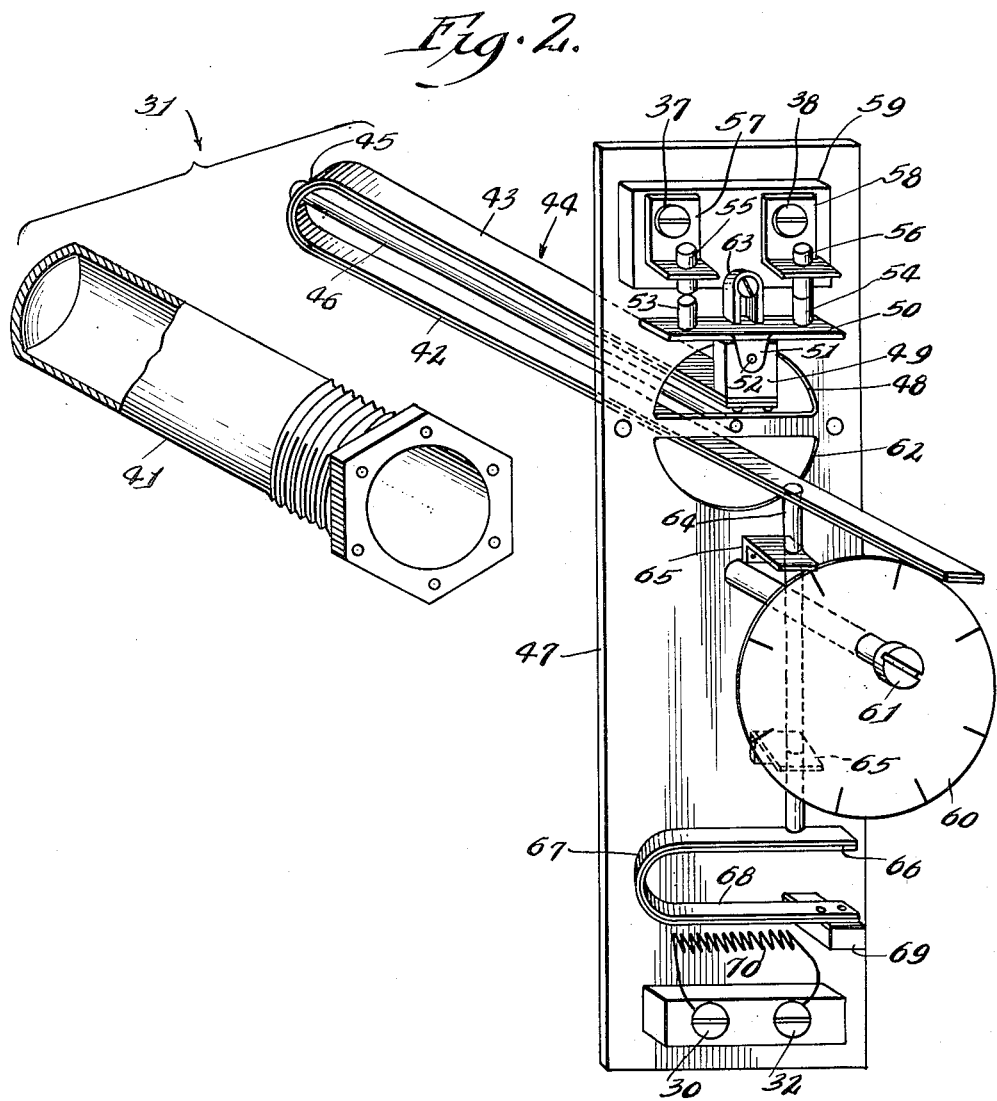

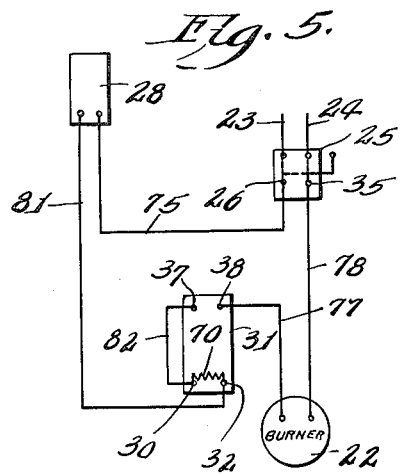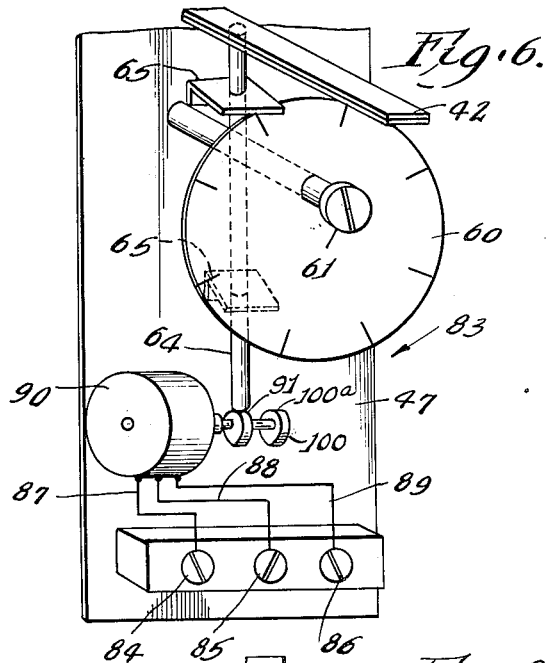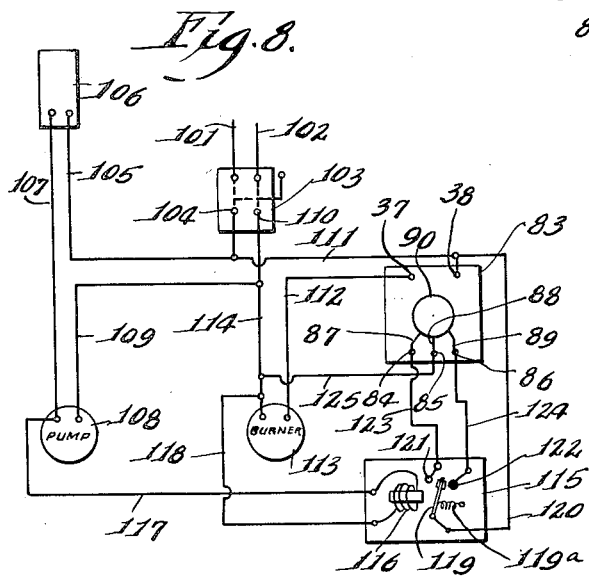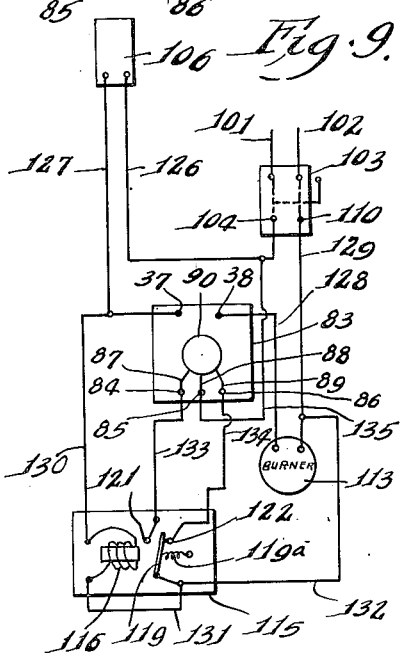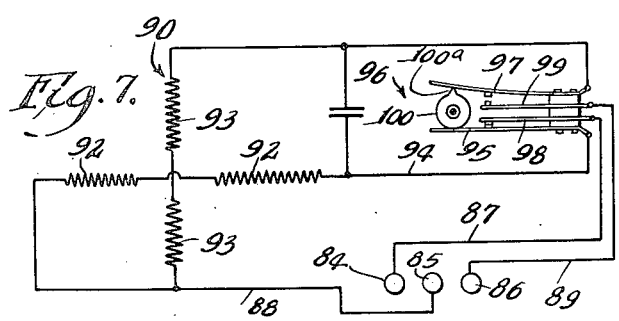

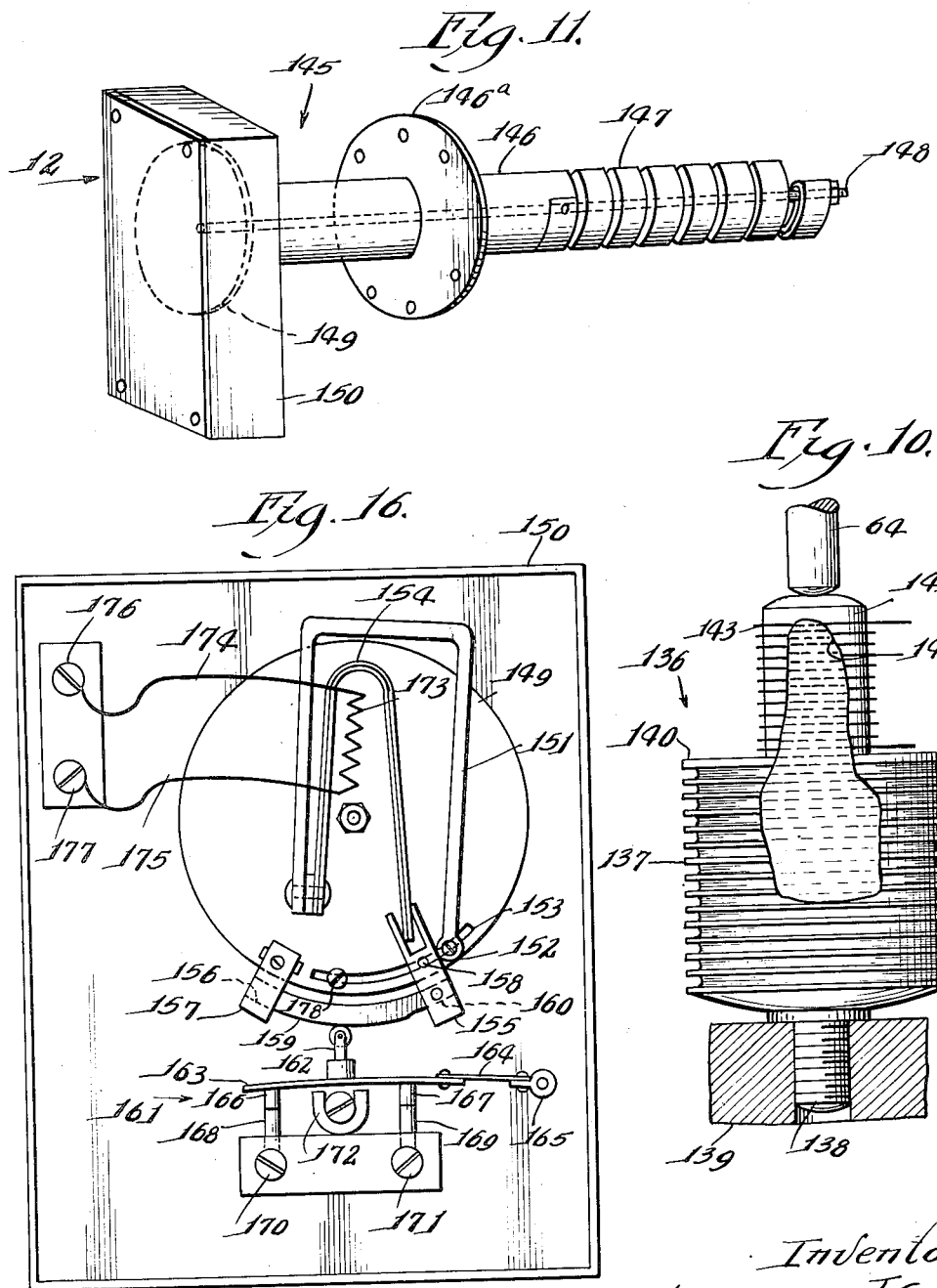

Dec. 16, 1952　　　　　　　L. J. SMITH　　　　　　　2,621,856
FIRING UNIT CONTROL FOR HEATING SYSTEMS
Filed Dec. 22, 1947　　　　　　　　　　　　8 Sheets-Sheet 5
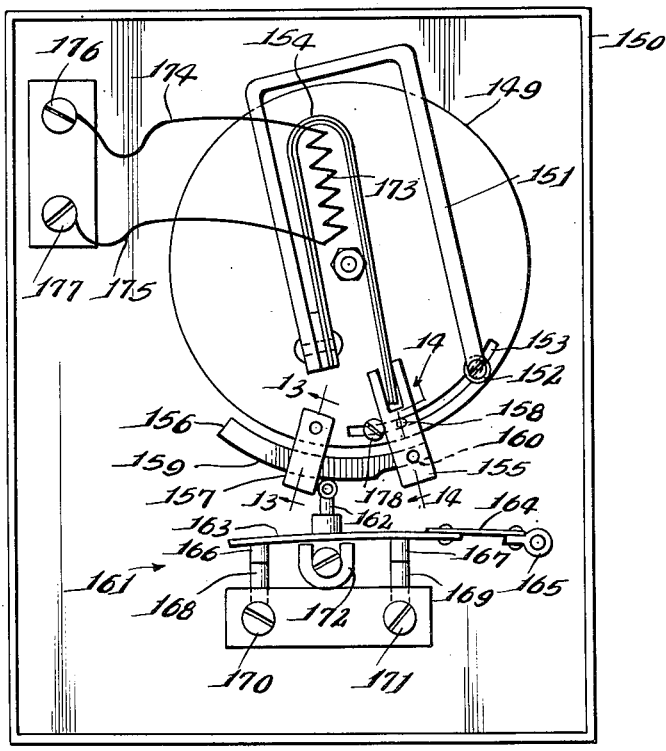
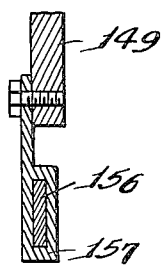
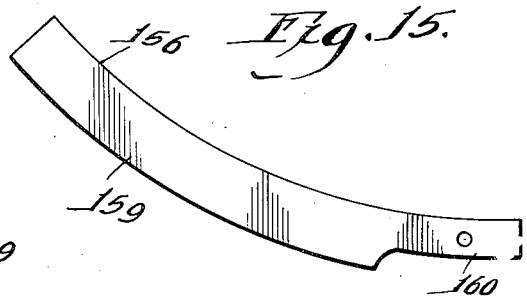
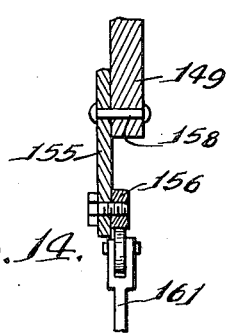
Inventor:
Lawrence J. Smith.
By John M. Darley
Attorney.

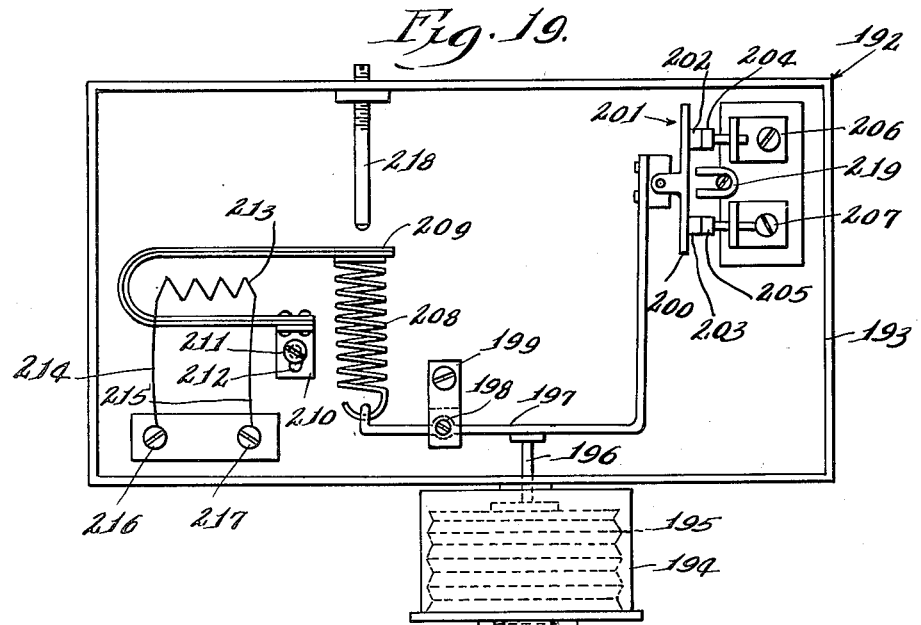
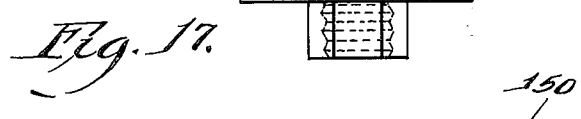
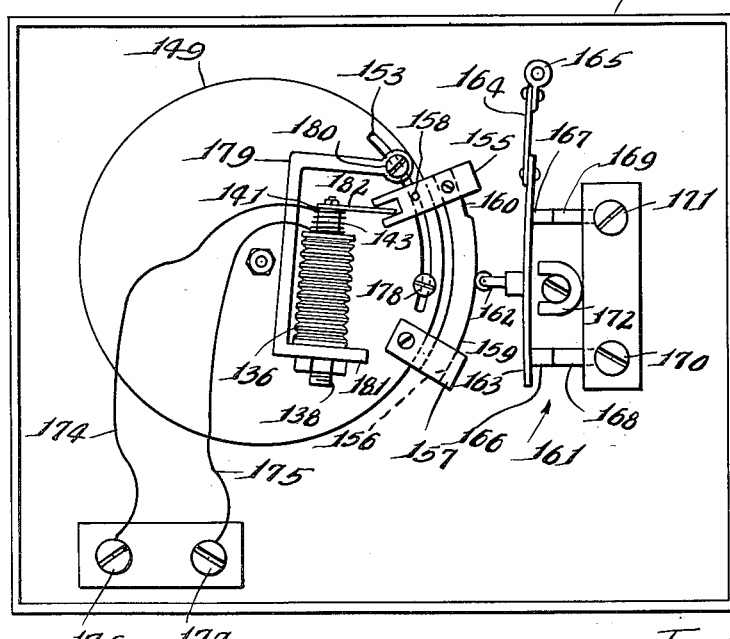

Dec. 16, 1952 — L. J. SMITH — 2,621,856
FIRING UNIT CONTROL FOR HEATING SYSTEMS
Filed Dec. 22, 1947 — 8 Sheets-Sheet 7

Inventor,
Lawrence J. Smith.
By John Darley
Attorney.

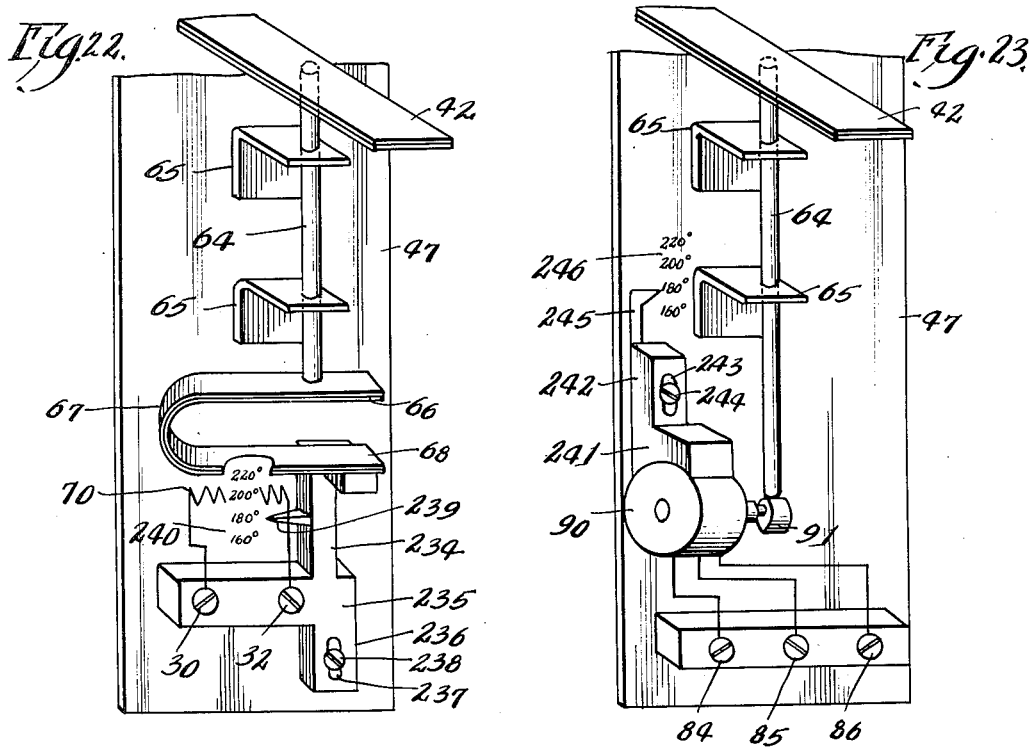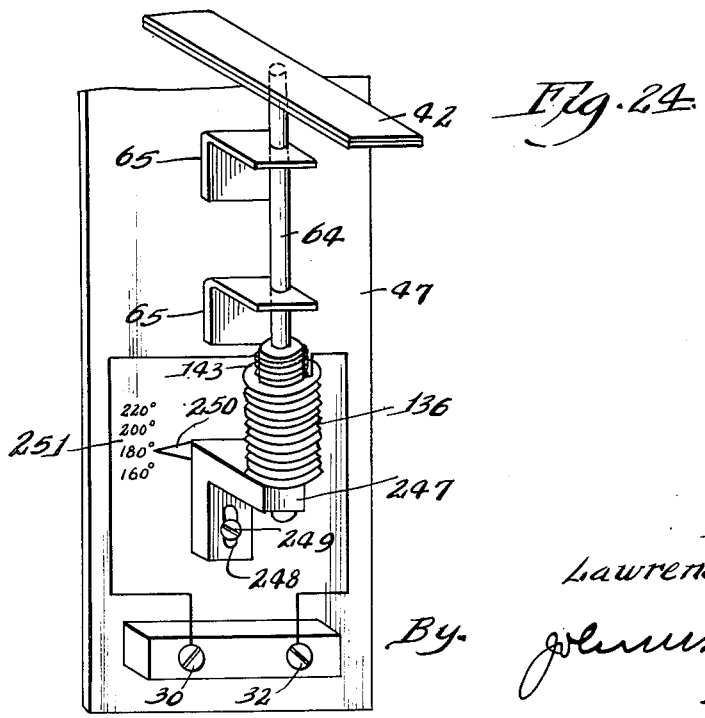

Patented Dec. 16, 1952

2,621,856

UNITED STATES PATENT OFFICE 2,621,856

FIRING UNIT CONTROL FOR HEATING SYSTEMS

Lawrence J. Smith, Oak Park, Ill., assignor to Bell & Gossett Company, Morton Grove, Ill., a corporation of Illinois Application December 22, 1947, Serial No. 793,216

5 Claims. (Cl. 236—9)

My invention relates to a control for automatically regulating the operation of a firing unit for a heating system with the object of providing more constant room temperatures and of reducing fuel consumption.

In a characteristic hot water heating system of the forcibly circulated type wherein the service water is indirectly heated by the boiler water, the pump is controlled by a room thermostat while the firing unit is independently controlled by an "aquastat" immersed in the boiler water and manually adjustable to maintain a selected maximum temperature thereof. When the boiler water temperature falls below this maximum, the firing unit begins functioning and continues operation until the water temperature is raised to the adjusted value.

A major objection to this arrangement is its incapacity to automatically adjust to changes in the heating demand during the heating season and to accomplish this result economically. No particular problem arises in the summer period for the aquastat may be permanently set to a temperature that will provide hot service water which, in the case of domestic installations, usually means a maximum boiler water temperature of about 160° F. Winter weather, however, imposes an additional load on the boiler in that heat must be provided for the radiators and, in the above system, this condition is met by readjusting the "aquastat" to raise the maximum temperature of the boiler. If this adjustment is set for extreme cold weather, say a boiler water temperature of about 210° F., and periods of milder weather are thereafter encountered, it will be obvious that the boiler is maintained during such periods at a temperature considerably higher than necessary for the existing heat demand which accordingly means a higher stand-by heat loss. The only manner in which such systems can be most economically operated during the heating season to produce even room temperatures is by manually changing the adjustment of the "aquastat" from time to time to accord with varying heat demands imposed by changes in the outside temperature, but this makeshift introduces a manual factor into an otherwise automatic system and is therefore objectionable.

A comparable condition exists in a gravity flow system which is fired by an automatically controlled burner and in which the thermostat and "aquastat" are series connected to the burner. If the "aquastat" is set to establish a boiler water temperature necessary for severe winter weather, it will be obvious that, due to slow water circulation and the consequent inherent lag in the response of the thermostat, the boiler water will be heated to a higher temperature than conditions require before the thermostat opens. This situation can be remedied only by manually resetting the "aquastat" from time to time.

It is therefore one object of my invention to devise an arrangement for automatically controlling the firing unit of a heating system so that the temperature of the heating medium delivered by the boiler or furnace varies indirectly with changes in outside temperatures.

A further object is to provide a control of the character indicated which may be used with hot water, hot air and steam heating systems employing any type of firing unit.

A further object is to provide a control which precisely ties in the space heating demand to the operation of the firing unit so that the latter need not function for longer periods than the then heat demand requires.

A further object is to devise a control as above set forth which materially reduces the stand-by heat loss of the boiler during periods of mild weather in the heating season.

These and further objects of the invention will be set forth in the following specification, reference being had to the accompanying drawings, and the novel means by which said objects are effectuated will be definitely pointed out in the claims.

In the drawings:

Fig. 1 is a schematic view of a typical, forcibly circulated, hot water heating system equipped with one form of my improved control.

Fig. 2 is an enlarged, perspective and partially separated view of the control shown in Fig. 1.

Figs. 3, 4 and 5 are modified circuit arrangements embodying the control shown in Fig. 2.

Fig. 6 is a fragmentary view of the lower end of the control illustrated in Fig. 2 showing a modification thereof in which a reversible motor is employed for automatically varying tension in the bimetal member that is responsive to the temperature of the boiler water.

Fig. 7 is a schematic wiring diagram showing the reversing connections in the motor illustrated in Fig. 6, the connections being associated with a limit switch which restricts the motor to a one-half revolution in either direction.

Fig. 8 shows a circuit arrangement incorporating the control illustrated in Fig. 6 for regulating a pump and firing unit.

Fig. 9 shows a circuit in which the Fig. 6 control is used to regulate a firing unit only.

Fig. 10 is an elevation, partly in section, showing a heat motor which may be employed instead of the heated bimetal strip and reversible motor shown in Figs. 2 and 6, respectively, for varying tension in the bimetal member that is exposed to the boiler water.

Fig. 11 is a perspective view of a variant form of the control for use with hot air furnaces.

Fig. 12 is an end view of the control shown in Fig. 11 looking in the direction of the arrow 12, the cover being removed and the parts of the control occupying positions assumed when the furnace is cold.

Figs. 13 and 14 are enlarged sections along the lines 13—13 and 14—14, respectively, in Fig. 12.

Fig. 15 is an enlarged, plan view of the arcuate cam as it appears in Fig. 12.

Fig. 16 is a view similar to Fig. 12, but showing the parts in relative shifted positions to establish a higher limit setting occasioned by the longer operational cycles of the room thermostat due to colder weather conditions.

Figure 18:
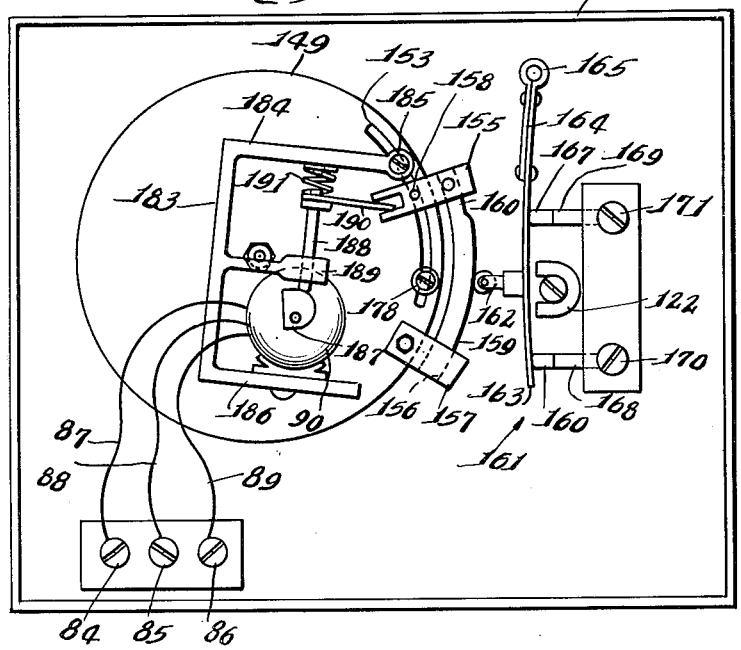

Figs. 17 and 18 are modified forms of the control shown in Fig. 12, the variations consisting in substituting the heat motor shown in Fig. 10 and the reversing motor illustrated in Fig. 7, respectively, for the bimetal member shown in Fig. 12, the parts being shown in the relatively shifted or heat demand positions similar to those illustrated in Fig. 16.

Fig. 19 is an elevation of a pressure responsive form of the control arranged for use with a steam heating system, the switch portion of the control being shown in closed position.

Figure 20:
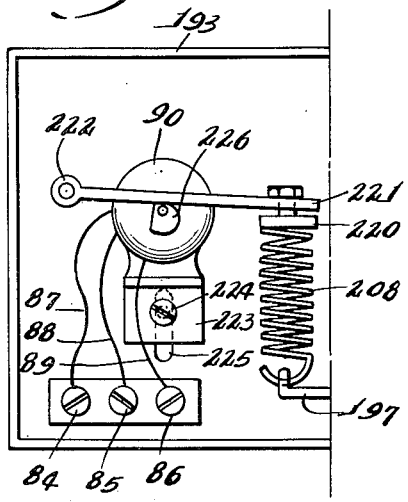
Figure 21:
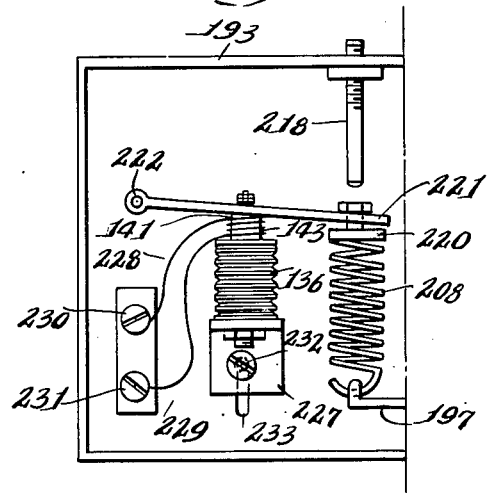

Figs. 20 and 21 are fragmentary views showing the application of the reversing motor in Fig. 7 and the heat motor in Fig. 10, respectively, to the pressure responsive control illustrated in Fig. 19.

Figs. 22 and 23 are fragmentary views showing modifications of the lower ends of the controls illustrated in Figs. 2 and 6, respectively.

Fig. 24 also shows a modification of the Fig. 2 control in which the heat motor illustrated in Fig. 10 is used to vary the tension in the bimetal member responsive to boiler temperature.

Referring to Fig. 1, the numeral 10 designates a typical, hot water boiler equipped with the usual expansion tank 11 and pressure relief valve 12. Leading from the upper portion of the boiler is a supply pipe 13 which may include any standard form of pump actuated, flow control valve 14 and which conveys hot water to a system of radiators, one of which 14ᵃ is shown. Return flow from the radiators is accommodated by a pipe 15 which may include a motor driven, circulating pump 16. Heating of the service water is accomplished indirectly by an exhanger type of water heater 17 forming part of a local pipe circuit 18 connecting upper and lower parts of the boiler 10. Pipes 19 and 20 connect the coil 21 in the heater 17 with a storage tank (not shown). The firing unit for the boiler is designated by the numeral 22 and it may be of any selected, electrically controlled type using solid, liquid or gaseous fuels.

So far as described, the heating system follows well known patterns, but differs therefrom in the novel, electrical circuit means for controlling the firing unit 22 for economical operation under varying heat demands and these means will now be described.

Power wires 23 and 24 connect to input terminals of a switch 25 and one output terminal 26 of the switch is connected by a wire 27 to a room thermostat 28 which in turn is connected by a wire 29 to a terminal 30 provided on a control 31 which will be described more particularly hereinafter. Within the control 31, the terminal 30 electrically connects with a terminal 32 which is linked by a wire 33 with one terminal of the motor driven, circulating pump 16, the other terminal of the pump connecting by a wire 34 to the other output terminal 35 on the switch 25. A wire 36 connects the wire 27, or the terminal 26, with a terminal 37 forming part of the control 31 and the latter terminal is connected within the control 31 through a switch responsive to boiler water temperature with a terminal 38 also on the control 31. The firing unit 22 is connected by a wire 39 with the terminal 38 and by a wire 40 with the wire 34, or directly to the switch terminal 35.

The control 31 is more particularly illustrated in partially exploded relation in Fig. 2 to which reference will now be made. It comprises a well 41 which is threaded through a wall of the boiler, preferably adjacent the upper portion thereof so as to be always bathed with the hottest boiler water. Extending within the well 41 are the limbs 42 and 43 of a bimetallic, thermally responsive, U-shaped member 44, the free ends of the limbs projecting outwardly of the boiler and the opposite ends being connected within the well by a bight 45. The member 44 is supported so that the limbs may freely move in response to boiler temperature changes and to manual and automatic adjustments, as presently described, by means of a cantilever rod 46 whose ends are respectively connected to the bight 45 and a back plate 47 which is suitably fastened to the outer end of the well 41.

The limb 43 extends through an aperture 48 in the plate 47 and carries on its free extremity an insulating block 49 on which an electrically conducting base 50 is rockably mounted at its midportion by means of depending ears 51 and a pintle 52 extending through the block. Upwardly extending contacts 53 and 54 are carried by opposite ends of the base 50, respectively, in operative relation to downwardly extending contacts 55 and 56 carried by brackets 57 and 58 which are electrically connected to the terminals 37 and 38, all respectively. The terminals 37 and 38 and the brackets 57 and 58 are carried by and insulated from the plate 47 by means of a block 59. The above arrangement is such that one pair of the coacting contacts is always closed and the terminals 37 and 38 are connected by closing the other pair, thus completing the circuit through the firing unit 22. For convenience, the contacts 54 and 56 are denoted as being the constantly closed pair.

The thermally responsive member 44, which together with its associated contacts and adjusting features constitute a limit control, is arranged so that of the two component, metal strips, that having the higher expansion coefficient is positioned outwardly of the member. Hence, when exposed to heat, the limbs 42 and 43 move towards each other, thus providing a means for separating the contacts 53 and 55 which are closed in a manner that will now be described.

Manual closing of the latter contacts may be effected through the agency of a circular disk 60 eccentrically mounted on a shaft 61 which is journaled in the plate 47. The peripheral edge of the disk 60 is operably related to the underside of the free end of the limb 42 which projects through an aperture 62 in the plate 47 beyond the similar end of the limb 43. Rotation of the disk 60 exercises a camming action on the limb 42 and a closing of the contacts 53 and 55, thus providing a means for varying tension in the member 44 with an accompanying variation in the temperature at which the member will respond to open the contacts. The disk 60 may be calibrated in degrees, or the shaft 61 may carry a pointer which moves over a calibrated dial (not shown). This type of manual adjustment is well known and in and of itself forms no part of the present invention, except as it is related to the automatic control features. Snap action of the contacts 53 and 55 during closing may be effected by a permanent magnet 63 carried by the insulating block 59 and having its poles operably related to the metal base 59. The pull of this magnet is overcome by the contracting movements of the limbs 42 and 43 when the temperature of the boiler water attains a value determined by the then adjustment of the member 44.

Automatic control of the firing unit is tied in with the demand for heat so that as this demand varies, the average temperature of the boiler water changes accordingly. Hence, the temperature of this water will be maintained higher during periods of cold weather than on days when the weather is milder. For this purpose, a rod 64 is slidable through a pair of spaced brackets 65 carried by the plate 47, the upper end being disposed in proximity to the underside of the limb 42 and the lower end resting on the free limb 66 of a bimetallic, U-shaped, thermally responsive member 67 whose other limb 68 has its end secured to a block 69 fastened to the plate 47. The inner strip of the member 67 has a higher expansion coefficient than the outer strip so that when the member is heated, the limb 66 moves upwardly to engage the rod 64 with the limb 42. Heating of the member 67 is accomplished by a resistance 70 bridged between the terminals 30 and 32 in operable relation to the limb 68. This resistance is in series with the thermostat 28 and the electrical portion of the pump 16 and, hence, the resistance is constantly heated during periods of pump operation. From the foregoing, it will be obvious that the circuit including the thermostat 28, the electrical part of the pump 16 and the resistance 70 is in parallel with the circuit including the electrical part of the burner 22 and the thermally responsive contacts 53 and 55.

During the summer, the control operates in a manner similar to existing installations, i. e., the thermostat is set so that it cannot complete the circuit through the pump 16 and therefore the resistance 70 is rendered inactive, and the disk 60 is manually adjusted to secure that maximum, boiler water temperature which is necessary for the required temperature of the service water. If the boiler water temperature is then below the setting of the control, the contacts 53 and 55 are closed and remain closed until the boiler water attains the selected temperature. Thereafter, these contacts close and open at intervals dependent upon the amount of service water drawn from time to time with resulting cooling of the boiler. When the heating season begins, the summer setting of the control may be left undisturbed, if desired, to establish a basic maximum temperature for the boiler water and to leave to the automatic control means the raising of this maximum as the demand for heat rises with the approach of and during cold weather.

On mild days in the fall, the thermostat 28 may occasionally demand heat, particularly in the evenings, so that the pump 16 operates to circulate hot water through the radiators. Some heating of the resistance 70 will occur during these periods of circulation and whether or not actuation of the rod 64 is thereby effected will depend upon the length of time that the thermostat is closed. In any case, it will be obvious that, on the first relatively cold day, the pump will operate for longer periods to satisfy the increased heat demands and the rod 64 will accordingly be actuated to increase the tension in the limbs of the member 44 and to close the contacts 53 and 55 if open at that time. This tension increase is additional to that imposed by the disk 60 and so the firing unit 22 remains in operation to raise the temperature of the boiler water to a higher value than that dictated by the disk 60 before the contacts 53 and 55 open. This condition continues for the duration of the cold weather period which means that whenever the thermostat 28 demands heat, there is present in the boiler water at a higher temperature than would otherwise be available from a manual setting of the control, unless the latter was set to obtain a temperature higher than necessary on mild days. With this arrangement, more even room temperatures can be maintained with a reduction in fuel requirements compared to the ordinary, manually controlled "aquastat."

When mild days intervene between colder periods, the pump operates for shorter cycles with a consequent reduction in the tension imposed on the member 44 and in the maximum temperature of the boiler water. Hence, on mild days, the stand-by heat loss from the boiler is materially less than that in systems where the manually controlled "aquastat" is adjusted to provide a boiler water temperature necessary for colder weather.

It will be understood that, in some installations, it may be desirable to enclose the bimetal member 67 and the resistance heater 70 in an insulated casing so that heat loss from the heater will not be unduly disturbed by the surrounding air and will be effective on the member 67 for several hours. This feature is not shown in the drawings for the sake of clearness.

While the automatic control has only been illustrated in connection with a hot water heating system, it can also be used to regulate pressures in steam heating systems, including pressure, vapor and vacuum types, and also in forced hot air systems, the fan in the latter systems corresponding to the circulating pump in hot water installations, except that, as is customary in hot air systems, the operation of the fan is delayed until a predetermined temperature is established in the bonnet of the furnace.

In Fig. 1, the circuit arrangement places the resistance 70 in series with the electrical portion of the pump 16, but, in Fig. 3, a modified circuit is illustrated in which this resistance is placed in parallel with the similar part of the pump. Like parts are indicated by like numerals in the two figures. As will be obvious in Fig. 3, one terminal 30 of the control 31 connects by a wire 71 with a wire 72 that extends between the thermostat 28 and one terminal of the pump 16, while the terminal 32 is electrically connected by a wire 73 with a wire 74 which connects the other pump terminal with the switch terminal 35 so that the resistance 70 is in parallel with the motor which drives the pump. Otherwise, the circuit is the same as that shown in Fig. 1 and operates in like manner.

In Fig. 4 is illustrated a further modified circuit for use with a heating system that is not equipped with a pump. The burner 22, switch 25, thermostat 28 and control 31 are identical with the like parts described above and so are designated by like numerals.

A wire 75 connects the switch terminal 26 with one terminal of the thermostat 28 while the other terminal of the latter connects by a wire 76 with the control terminal 37. A wire 77 connects the control terminal 38 with one terminal of the burner 22 whose other terminal connects by a wire 78 with the switch terminal 35. The control terminal 30 connects by a wire 79 with the wire 76 while the control terminal 32 connects by a wire 80 with the wire 78. Hence, demands of the thermostat 28 for heat would establish a current flow through the resistance 70 and an automatic raising of the boiler water temperature during periods of cold weather.

In Fig. 5 is illustrated a modification of the circuit shown in Fig. 4 which differs from the latter in providing for a series flow of the current through the electrical parts of the control 31. Like parts of the two circuits are designated by like numerals.

The thermostat 28 connects by a wire 81 with the control terminal 32 and the control terminal 30 connects by a wire 82 with the control terminal 37; otherwise, the connections are identical with those shown in Fig. 4. So long as the thermostat 28 is closed, the firing unit 22 operates and current flows through the resistance 70 to produce the results noted above.

A modified form of the control 31 is illustrated in Fig. 6 and is designated by the numeral 83. This modification differs from the control 31 only in the automatic means for varying the tension in the member 44 and hence the temperature of the boiler water in accordance with heating demands, and is intended as an alternate construction for the actuating unit comprising the bimetal member 67 and resistance 70. Only the lower portion of the control 83 is illustrated in Fig. 6 and it will be understood that, except for the new parts presently described, the controls 31 and 83 are identical and to the extent that common parts are shown in Fig. 6, they are designated by like numerals.

Contacts 84, 85 and 86 are insulatingly mounted on the back plate 47 and are respectively connected by wires 87, 88 and 89 to a low speed, reversible, gear type motor 90, which may be a three wire, reversible, synchronous capacitor, shaded pole motor and is so illustrated. The wire 88 is common to the two controlling circuits for the motor and the arrangement is such that when potential is applied across the contacts 84 and 85, the motor will run in one direction and when applied across the contacts 85 and 86, the motor will rotate in the opposite direction.

A clock motor is satisfactory for the purpose and its speed may be of the order of about one revolution per three hours, although the motor speed may vary for different installations. Mounted on the motor shaft in operative relation to the lower end of the rod 64 is a cam 91 whose profile may be generally heart shaped as shown, or it may be otherwise shaped provided that rotation thereof in one direction will raise the rod 64 and in the opposite direction will permit lowering of the rod.

One specific arrangement for reversing the motor 90 at intervals with provision for limiting the extent of rotation in each direction is shown diagrammatically in Fig. 7 to which reference will now be made. The respective, reversing field windings of the motor 90 are indicated by the numerals 92—92 and 93—93. The windings 92 are connected at one end by the wire 88 to the common terminal 85 and at the opposite end by a wire 94 to a springy contact arm 95 forming part of a limit switch 96, while the windings 93 are also connected at one end by the wire 88 to the terminal 85 and at the opposite end to a springy, contact arm 97 forming part of the switch 96. Between the arms 95 and 97 is located a pair of spaced, contact arms 98 and 99, which are respectively connected by the wire 87 with the terminal 84 and by the wire 89 with the terminal 86, the arm 98 being positioned for coaction with the arm 95 and the arm 99 with the arm 97. The arms are held at one end in spaced and insulated relation from each other and at the opposite ends, the arms 95 and 97 extend beyond the adjacent ends of the arms 98 and 99 for actuation by a single lobe cam 100 which is mounted on the shaft of the motor 90 and determines the engaging or separating of the respective pairs of contact arms. This cam and the switch 96 are not illustrated in Fig. 6, but it will be understood that the position of the motor shaft is the same in Figs. 6 and 7 and hence that the high points of the cams 91 and 100 are located 180° apart. Specifically, the cam 100 is of the quick lift type and its single lobe 100ᵃ is shaped so that only a slight rotational movement of the cam from the position shown in Fig. 7 is necessary to secure a closure of the contacts 97 and 99 for a purpose presently explained.

From the foregoing, it will be understood that with the parts occupying the positions shown in Fig. 7, i. e., with the arms 95 and 98 in engagement and the arms 97 and 99 separated by the cam 100, if a potential is applied across the terminals 84 and 85, current flows only through the windings 92 and the motor rotates in one direction until the arms 95 and 98 are separated by the cam 100, or the potential applied to the terminals 84 and 85 is interrupted, whichever first occurs, and rotation then ceases. At this time, the contacts 97 and 99 being engaged, the motor will rotate in the opposite direction upon the application of a potential to the terminals 85 and 86. The manner of applying these potentials to the terminals 84 and 85, and 85 and 86, will be presently described, but, in any case, it will be apparent that the rotation of the motor 90 is limited by the switch 96 to a one-half turn in each direction, corresponding to the high and low points of the cam 91 (see Fig. 6).

One circuit embodying the control 83 is illustrated in Fig. 8 to which reference will now be made. Power wires 101 and 102 are connected to a main switch 103 and one output terminal 104 thereof connects by a wire 105 with a room thermostat 106 that is positioned to be affected by the radiator 14ᵃ. A wire 107 connects the thermostat 106 with the driving motor of a circulating pump 108 and the circuit through this motor is completed by a wire 109 which connects with the other output terminal 110 of the switch 103.

In the firing unit circuit, a wire 111 connects the wire 105, or the switch terminal 104, with the control terminal 38 which is periodically connected within the control 83 by the contacts 53 and 55 (see Fig. 2) with the control terminal 37. The latter terminal connects by a wire 112 with the firing unit 113 which in turn connects by a wire 114 with the wire 109, or the switch terminal 110.

Operation of the motor for automatically regulating the tension in the bimetal member 44 is controlled by a relay 115 having a holding coil 116 which is respectively connected by a wire 117 with the wire 107 and by a wire 118 with the wire 114. Hence, the coil 116 is in parallel with the motor of the pump 108 and will be energized during periods of heat demand by the thermostat 106. Operatively related to the coil 116 and acting with respect thereto as an armature is a pivoted, switch arm 119, one end of which connects by a wire 120 with the wire 111, or switch terminal 104, while the other end moves between contacts 121 and 122. The arm 119 is biased to the position shown in Fig. 8 by a spring 119ᵃ. Contact 121 connects by a wire 123 with control terminal 84 and contact 122 connects by a wire 124 with control terminal 86. Common control terminal 85 connects by a wire 125 with the wire 114, or switch terminal 110.

In the arrangement of parts shown in Figs. 6, 7 and 8, the thermostat 106 is open, the pump 108 is not operating, the rod 64 is resting on the low point of the cam 91, and the firing unit 113 may or may not be operating depending upon the then tensioning of the bimetal member 44. It will be understood that the cam 91 may have been brought to the position shown in Fig. 6 by reason of the switch arm 119 occuping the position shown in Fig. 8 which completes the circuit to the motor 90 through wires 124 and 125, thereby utilizing the field windings 93 and causing the motor to rotate in one direction until the contact arms 97 and 99 are separated by the cam 100, corresponding to the low point of the cam 91 and thus breaking the motor circuit through wires 124 and 125. The cam 91 may or may not reach the position shown in Fig. 6 depending upon the time elapsed between the last demand and the next of the thermostat 106 for heat, but, assuming that the cam 91 is in the position shown in Fig. 6, then the cam 100 will occupy the position shown in Fig. 7, i. e., one in which potential no longer exists across the terminals 85 and 86 and the motor 90 is at rest. When the thermostat 106 closes, the pump 108 begins running and the holding coil 116 is energized and attracts the switch arm 119 to engage the contact 121 to thereby close the circuit of the motor 90 through wires 123 and 125 and effect a rotation of the motor in the opposite direction. This reversal is effected by directing current flow through the field windings 92, as indicated by the connections shown in Fig. 7 and as brought about by the shift in position of the switch arm 119, the contact arms 95 and 98 then being engaged and the arms 97 and 99 separated as of the instant when the motor starts rotation. The rotation of the cam 91 raises the rod 64 to thereby increase the tension in the limbs of the member 44 and to close the contacts 53 and 55 if open at that time. The results produced by the motor 90, so far as shifting of the rod 64 is concerned, are similar to those effected by the bimetal member 67, i. e., each provides a variable, automatic control on the temperature of the boiler water in accordance with shifting heat demands.

When the thermostat 106 is satisfied, the pump 108 ceases operation and the coil 116 is deenergized. The switch arm 119 returns to the position shown in Fig. 8, thus reestablishing the motor circuit through the terminals 85 and 86 since the limit switch 96 was conditioned for reversal by the cam 100, due to the quick lift, cam lobe 100ᵃ, which permits closure of the contact arms 97 and 99 immediately after the closing of the thermostat 106 started the motor 90 rotating. Accordingly, the motor is reversed to slowly drop the rod 64. This reversal will occur before the high point of the cam 91 is reached if the thermostat 106 opens, or in any event when this high point is reached as a limiting position. However, the firing unit 113 continues in operation until the boiler water attains a temperature determined by the tensioning of the member 44, which temperature will, in general, be slightly lower than that indicated by the member 44 when the switch arm 119 swings from the contact 121 to the contact 122.

In Fig. 9 is illustrated a circuit employing the control 83 for use with a heating system that is not equipped with a pump and is a modification of the Fig. 8 circuit, utilizing the main switch 103, thermostat 106, control 83, relay 115 and firing unit 113, and other common parts identified by the same numerals.

A wire 126 connects the switch terminal 104 with one terminal of the thermostat 106 and the other terminal of the latter connects by a wire 127 with the control terminal 37. The control termianl 38 connects by a wire 128 with one terminal of the firing unit 113 whose other terminal connects by a wire 129 with the switch terminal 110. The holding coil 116 of the relay 115 respectively connects by a wire 130 with the wire 127 and by a wire 131 with the pivoted end of the switch arm 119. The latter end also connects by a wire 132 with the wire 129. The contact 121 and control terminal 84 are connected by a wire 133; the contact 122 and control terminal 86 are connected by a wire 134, while the common control terminal 85 connects by a wire 135 with wire 126, or switch termianl 104. Hence, demands of the thermostat 106 for heat energizes the coil 116 and the operation is otherwise identical with the circuit shown in Fig. 8, except that a pump is not involved.

A further means of varying the position of the rod 64 and one that can be substituted for the bimetal member 67 and resistance 70 in Fig. 1, or the reversible motor 90 in Fig. 6, is illustrated in Fig. 10. This means comprises a heat motor 136 having a bellows 137 from whose lower, closed end extends a stud 138 by which the heat motor may be supported on a block 139 as an abutment and which would be secured to the back plate 47 of the control 31 (see Fig. 2). The upper end of the bellows 137 is partially closed by a wall 140 and carried on the wall in coaxial relation to the rod 64 is a casing 141 whose interior communicates with the interior of the bellows 137. The casing 141 constitutes a reduced, upward extension of the bellows and the complete unit is filled with a suitable volatile liquid 142, such as is commonly used in devices of this nature. The upper end of the casing 141 is operably related to the lower end of the rod 64 and wound around the exterior of the casing in heat exchanging relation with the liquid is an electric heating coil 143 whose ends would be connected with the control terminals 30 and 32 in Figs. 1 and 2.

The heat motor 136 may be used with any of the circuit arrangements shown in Figs. 1, 3, 4 and 5, but assuming the Fig. 1 circuit, it will be apparent that when the thermostat 28 demands heat, the coil 143 will be heated and the vaporization of the liquid will raise the pressure in the bellows 137 and cause it to elongate upwardly against the block 139 as an abutment. Hence, the rod 64 will be raised to increase the tension in the bimetal member 44 and the remaining operation will be similar to that described in connection with Figs. 1 and 2.

The types of control described above are used with hot water boilers and associated systems, but in Figs. 11 to 16, inclusive, is illustrated a variant form of the control for use with hot air furnaces. This control, designated generally by the numeral 145, comprises a tube 146 (see Fig. 11) which extends through the furnace wall (not shown) and has fast thereon an escutcheon plate 146ª for anchorage to the wall. Secured to the inner or furnace end of the fixed tube 146 is one end of a bimetal helix 147 which is exposed to the hot air in the bonnet of the furnace, the opposite end of the helix being attached to a rod 148 which extends freely through the tube 146 and is secured at its outer end to a disk 149 within a housing 150. Suitable bearings (not shown) may be provided in the tube 146 and housing 150 to support the rod 148 for rotation.

The helix 147 is thermally responsive to temperature changes in the furnace bonnet and is arranged so that the component strip having the higher expansion coefficient is positioned inwardly of the helix. Hence, when subjected to a rising temperature, the helix unwinds and rotates the disk 149 in a clockwise direction, as viewed in the direction of the arrow 12 in Fig. 11.

Referring to Fig. 12, a stirrup 151 has one limb secured at its end to the disk 149 for rotation therewith. The initial position of the stirrup may be adjusted as desired by means of a clamping screw 152 which extends through the limb of the stirrup and an arcuate slot 153 which is concentric with the periphery of the disk 149. Secured to the other stirrup limb and lying between the limbs is one end of a U-shaped, bimetal member 154 whose opposite end is free to move and is received within the bifurcated end of an arm 155. The opposite end of the arm 155 is secured to one end of an arcuate cam 156 which is positioned outwardly of and concentric with the disk 149 and extends slidably through a radial guide 157 fixedly carried by the disk. Movements of the free end of the member 154 determine movements of the arm 155 relative to the disk 149 and hence of the cam 156, the arm being guided during such movements by a pin 158 extending from the arm through the slot 153. The outer periphery of the cam 156 includes surfaces 159 and 160 which are concentric with the disk 149, the former having the greater radius, as shown in Fig. 15, and the adjacent ends of these surfaces merging into each other.

The position of the cam 156 determines the opening and closing of a switch 161, the latter position being shown in Fig. 12 due to the fact that a cam follower 162 forming part of the switch is riding against the cam surface 159. The follower 162 is carried on the upper side of a metallic switch arm 163 which is connected by a spring link 164 to a rocker 165 pivoted in the housing 150. Depending from the under side of the arm 163 are electrical contacts 166 and 167 which are operably related to contacts 168 and 169, the latter in turn being electrically connected to terminals 170 and 171, all respectively.

The construction is preferably such that the contacts 167 and 169 are always in engagement and the circuit is made and broken through the terminals 170 and 171 by engaging and disengaging the contacts 166 and 168, as permitted by the flexibility of the spring link 164. When the contacts 166 and 168 are moved towards each other, as presently described, a snap engagement thereof is obtained by means of a permanent magnet 172 carried by the housing 150 and positioned to attract the arm 163. During disengagement of the contacts 166 and 168, the spring link 164 overcomes the action of the magnet. It will be understood that the follower 162 and the link 164 are suitably insulated from the switch arm 163.

To vary the position of the free end of the bimetal member 154, an electric heating coil 173 is positioned between the limbs of the member whose component strips are disposed so that the strip which possesses the higher expansion coefficient lies inwardly of the member. The ends of the coil 173 are connected by wires 174 and 175 to terminals 176 and 177, respectively, carried by the housing 150.

Since the control 145 is used with a hot air heating system, it may be connected in either of the circuits shown in Figs. 4 and 5 as a substitute for the control 31. Under these circumstances, the terminals 170 and 171 correspond to the terminals 37 and 38, and the terminals 176 and 177 to the terminals 30 and 32 in the indicated figures. Assuming a cold condition of the furnace, the parts of the control then occupy the positions shown in Fig. 12, the switch 161 being closed since the follower 162 rides on the cam surface 159, and the burner 22 not operating since the thermostat 28 is open.

When the thermostat 28 demands heat, the circuit is completed through the burner 22 and also through the heating coil 173. Burner heat is applied to the bimetal member 147 which begins to unwind and rotate the disk 149 in a clockwise direction as viewed in Fig. 12. At the same instant, heat from the coil 173 is also applied to the bimetal member 154 which causes its free limb to move generally opposite to the direction of rotation of the disk 149. Hence, the arm 155 moves relative to the disk 149 and in the opposite direction, withdrawing the cam 156 through the guide 157 and maintaining the cam surface 159 in contact with the follower 162, thus keeping the switch 161 closed.

But for the relative movement imparted to the cam 156, the burner 22 would cease operation when the disk 149 had rotated sufficiently to register the cam surface 160 with the follower 162, because when this relationship of parts is established, the switch 161 opens even through the thermostat 28 may then be closed. In other words, this form of control is characterized by a delayed action which enables the burner to remain in operation throughout the period of demand by the thermostat 28 subject to a maximum top limit temperature in the furnace bonnet imposed by the anchored end of the stirrup 151 which acts as a stop to limit the cam withdrawing movement of the arm 155 (see Fig. 16). The burner remains in operation until the thermostat 28 opens, or, assuming that the arm 155 has been shifted to the position shown in Fig. 16 or in any less retarded position, until the rotation of the disk 149 registers the cam surface 160 with the follower 162, whichever first occurs. When the burner shuts down, the contraction of the bimetal member 147 starts the disk 149 rotating in the opposite direction and, since the circuit is also broken through the heating coil 173, the member 154 contracts and shifts the arm 155 in the same direction. The several parts eventually reach the "cold" positions shown in Fig. 12 with the switch 161 closed, unless, in the meantime, the thermostat 28 has demanded heat. The control is then conditioned to start the burner whenever the thermostat 28 closes.

The maximum traverse of the cam is determined by movements of the arm 155 between the anchored end of the stirrup 151 which acts as a high limit and by a stop 178 adjustably mounted in the slot 153 which serves as the low limit. Rotation of the disk caused by contraction of the member 147 is limited by engagement of the guide 157 with the follower 162, thus determining the initial "cold" position of the disk 149.

It is contemplated that the bimetal members 147 and 154, and the heating coil 173 will be so related that, assuming a start from a cold condition and a sustained heat demand, it will require about one and one-half hours before the disk 149, operating through the anchored end of the stirrup 151 and the arm 155, shifts the cam 156 to a position in which the follower 162 rides on the cam surface 160 to thereby open the switch 161 and cut out the burner. Different adjustments of the members 147 and 154 and the coil 173 may be made to suit variant conditions as desired.

In Fig. 17 is illustrated a varied form of the control shown in Fig. 12, the modification consisting in substituting the heat motor 136, indicated in Fig. 10, for the heating coil 173 and bimetal member 154 as a means for varying the position of the cam 156. Except for this change, the Fig. 17 control is identical with that shown in Fig. 12 and is also used in the Fig. 4 or Fig. 5 circuits, so like parts are designated by like numerals.

One limb of a U-shaped stirrup 179 is adjustably anchored to the disk 149 for rotation therewith by means of a screw 180 which extends through the slot 153. The open side of the stirrup 179 faces the slot and the bottom of the the heat motor 136 is secured to the inner face of the other stirrup limb 181 by means of the stud 133 which extends through the latter limb. An arm 182 is secured at one end to the heat motor casing 141 and its other end extends freely within the bifurcated end of the arm 155. The wires 174 and 175 connect the terminals 176 and 177, respectively, with the heating coil 143 which is wound around the casing 141.

The parts of the Fig. 17 control, other than the heat motor, are shown in positions comparable to those illustrated in Fig. 16 and the heat motor is shown in extended position as effected by the heating of the volatile liquid in the casing 141 when the thermostat 28 closes, i. e., a position which would place the other parts of the control in the locations shown. When the thermostat opens, or the burner 22 ceases operation, whichever first occurs, the heat motor 136 returns to its fully retracted position and the other parts of the control assume the positions indicated in Fig. 12, unless the thermostat 28 demands heat in the meantime.

Referring to Fig. 18, there is illustrated a further variation of the furnace control shown in Fig. 12 in which the reversible motor 90 indicated in Fig. 7 is employed to shift the cam 159 relative to the disk 149. The circuit shown in Fig. 9 is utilized with this form of the control, including the room thermostat 106, burner 113 and relay 115. The portions of the control which are identical with those illustrated in Fig. 12 are designated by like numerals, and the same procedure is followed with respect to those which are the same in Fig. 9. Further, it will be understood that the terminals 170 and 171 correspond to the terminals 37 and 38 in Fig. 9.

A stirrup 183 which is E-shaped in plan view has the end of its upper limb, as viewed in Fig. 18, adjustably anchored to the disk 149 by a screw 185 which passes through the slot 153, while the reversible motor 90 is secured to the lower stirrup limb 186. The motor is connected to the terminals 84, 85 and 86 by wires 87, 88 and 89, the terminals being in turn connected to the remainder of the circuit as shown in Fig. 9. It will be understood that the internal wiring of the motor 90 is as shown in Fig. 7 and that the motor therefore includes the limit switch 96 and the cam 100 secured to the motor shaft. Also secured to this shaft is a cam 187 positioned to cooperate with a stem follower 188 which is slidable through the intermediate limb 189 of the stirrup 183. One end of an arm 190 is secured to the upper end of the follower 188 and the opposite end of the arm extends freely within the bifurcated end of the arm 155. A helical spring 191 interposed between the stirrup limb 184 and arm 190 resiliently maintains contact of the follower 188 with the cam 187. This cam is shaped to provide a rising characteristic when the motor rotates in one direction and a falling characteristics when the motor rotates in the opposite direction.

The parts of the control shown in Fig. 18 which are identical with those shown in Fig. 12 occupy positions corresponding to those illustrated in Fig. 16. The arm 155 and attached cam 156 have been shifted to the position shown by the cam 187 by reason of the rotation of the motor 90 effected by a potential applied to the terminals 84 and 85 and due to the closing of the thermostat 106, all as described in connection with Fig. 9. The follower 188 is shown in its upper, limiting position and the motor 90 is now conditioned for reversal, as explained in connection with the circuit shown in Fig. 7, to thereby move the cam 156 toward a position permitting opening of the switch 161. With the exception of the use of the motor 90 as a means for shifting the cam 156, the operation of the control is identical with that illustrated in Fig. 12.

A pressure actuated form of the control is illustrated in Fig. 19, this form being suggested for use with steam boilers. This control, indicated by the numeral 192, comprises a casing 193, the cover of which is removed in the drawing to expose the interior, and a fitting 194 depending from the under side thereof for attachment to and communication with the steam space of a boiler (not shown). The interior of the fitting 194 is provided with a bellows 195 which is closed at the top and opens downwardly so that steam pressure is effective within the bellows.

The lower end of a pushrod 196 is secured to the top of the bellows 195 and extends freely upward through the lower wall of the casing 193 into operative relation to one arm of a lever 197 which is pivoted at 198 to a bracket 199 secured to the casing. The latter arm is bent upwardly and pivotally carries on its upper end a metallic, contact plate 200 suitably insulated from the arm and forming part of a switch 201. The plate 200 carries a pair of electrical contacts 202 and 203 which are operatively related to contacts 204 and 205 electrically connected to terminals 206 and 207, all respectively. The contacts are shown in engagement and it will be understood that the switch operates similarly to the comparable switch shown in the upper portion of Fig. 2, i. e., when the switch opens, as presently described, only one pair of contacts, 203 and 205, for example, separate. Switches of this type are well known in the art.

The other arm of the lever 197 is hooked to the lower end of a helical spring 208 whose upper end is attached to the free end of one limb of a U-shaped, bimetal member 209, while the end of the other limb of the member is secured to a bracket 210 which is adjustably mounted on the back wall of the casing 193 by means of a screw 211 which extends through an elongated slot 212 in the bracket.

An electric heating coil 213 is positioned between the limbs of the member 209 and the component strips of the latter are arranged to place the strip having the higher expansion coefficient inwardly of the member. Hence, when the latter is heated by the coil 213, the end of the upper limb of the member moves upward to further tension the spring 208. The coil 213 is electrically connected by wires 214 and 215 to terminals 216 and 217, respectively.

The Fig. 19 control may be used with the circuits shown in Figs. 4 and 5 and for the purpose of operating description will be regarded as substituted for the control 31 in Fig. 5. The terminals 206 and 207 correspond to the terminals 37 and 38 and the terminals 216 and 217 correspond to the terminals 30 and 32, all respectively. Otherwise, the circuit is the same as in Fig. 4.

Assuming that the control 192 has been mounted in a boiler as above described and that the bracket 210 has been adjusted to initially tension the spring 208 sufficiently to close the switch 201, then when the thermostat 28, closes, the burner 22 begins operation and steam pressure rises in the boiler, this pressure being active against that part of the lever 197 which lies to the right of the latter's pivot and operating in a direction to open the switch 201. At the same time, the coil 213 is applying heat to the member 209 causing its free end to move upward and further elongate the spring 208. Since this added spring pull is exerted against the lever to the left of its pivot, it acts in a direction opposite to the steam pressure actuated movement of the pushrod 196. This factor provides the desired control, insuring that the burner 22 remains in operation so long as the thermostat 28 demands heat, or until the steam pressure attains a predetermined maximum, whichever first occurs. When this maximum is reached, the switch 201 opens even though the thermostat 28 still requires heat and the burner 22 cuts out, the circuit also being broken through the coil 213.

The maximum steam pressure is determined by an adjusting screw 218 mounted in the top wall of the casing 193 above the member 209 in approximately coaxial relation to the spring 208. Hence, when the free end of the member 209 contacts the lower end of the screw 218, further pull on the spring 208 is prevented and the steam pressure is to that extent free to apply a circuit opening push on the switch 201. When the steam pressure drops sufficiently, the switch 201 is closed by the pull of the spring 208 and this closing movement is preferably accelerated by a permanent magnet 219 positioned in operative relation to the contact plate 200. The magnet 219 performs an additional function in that it prevents any fluttering action of the switch arising from the yielding forces, the steam pressure and the spring 208, which act against the lever 197.

In Fig. 20 which shows a fragment of the control 192, the latter is modified to incorporate the reversible motor 90 (see Fig. 7) for varying the pull on the spring 208 as a substitute for the bimetal member 209 and heating coil 213. Otherwise, the Fig. 20 control is identical with that illustrated in Fig. 19, except that the adjusting screw 218 is eliminated, and like parts are designated by like numerals.

The upper end of the spring 208 is secured to a spring cap 220 which in turn is fastened to the free end of a rock arm 221 pivoted at 222 in the casing 193. A bracket 223 is adjustably mounted on the rear wall of the casing 193 by means of a screw 224 extending through the bracket and an elongated slot 225 in the rear wall. This bracket carries the motor 90 and fast on the shaft thereof is a cam 226 positioned to ride against the under side of the arm 221 which acts as a follower under the pull of the spring 208. This cam has a rising characteristic which, when the motor rotates in one direction acts to rock the arm 221 upwardly and a falling characteristic when the motor runs in the opposite direction to thereby permit a lowering of the arm. In other words, the cam 226 generally corresponds in function to the cam 91 in Fig. 6.

The Fig. 20 modification would be used with the circuit arrangement shown in Fig. 9 as a substitute for the control 83 in the latter figure, the terminals 37 and 38 in control 83 corresponding to terminals 206 and 207 in Fig. 20. Otherwise, the Fig. 9 circuit would be the same and hence the motor 90 in Fig. 20 is connected by wires 87, 88 and 89 to terminals 84, 85 and 86.

Assuming that the switch 201 is closed and that the low point of the cam 226 contacts the arm 221, the thermostat 106 being open, then when the latter closes, the burner 113 begins operation and the motor 90 starts rotating, as explained in connection with Fig. 9, in a direction to raise the arm 221 and further elongate the spring 208. The burner 113 remains in operation so long as the thermostat 106 requires heat, or until the switch 201 opens, whichever first occurs, and in either of these events, the burner cuts out and the motor 90 is reversed for reasons already explained to return the cam 226 to the position shown in Fig. 20, unless the thermostat 106 demands heat before this position is reached. Initial tensioning of the spring 208 is determined by adjustment of the motor bracket 223 and the maximum pull on the spring, corresponding to the top limit steam pressure, is determined by the maximum throw of the cam 226.

In Fig. 21, there is illustrated a modification of the Fig. 20 form of the control in which the heat motor 136 is employed to raise the rock arm 221 as a substitute for the motor 90. The motor 136 is carried on a bracket 227 secured to the casing 193 and the arm 221 rests on the upper end of the motor casing 141. The heating coil 143 is connected by wires 228 and 229 to terminals 230 and 231 and since this modification is used with the circuits shown in Figs. 4 and 5, it will be understood that the terminals 230 and 231 correspond to the terminals 30 and 32, respectively, in the latter figures.

The parts in Fig. 21 are shown in their fully retracted position, the thermostat 28 being open and the switch 201 closed. From what has been explained above, it will be apparent that when the thermostat closes, the heat motor 136 will elongate and increase the pull on the spring 208, the operation otherwise being the same as for the Fig. 19 control. Maximum elongation of the spring 208 is determined by the arm 221 contacting the adjusting screw 218, and initial tensioning of the spring is determined by adjustably mounting the bracket 227 on a screw 232 which extends through the bracket and an elongated slot 233 in the rear wall of the casing 193.

In Fig. 22 is illustrated a further modification of the lower end of the Fig. 2 control which eliminates the manually adjustable, cam disk 60. The end of the limb 68 of the bimetal member 67 is secured to an upwardly extending arm 234 forming part of a bracket 235 having a downwardly extending arm 236. The latter arm includes a vertically, elongated slot 237 and a screw 238 extending through the slot and the back plate 47 enables the bracket 235 to be adjusted vertically. The terminals 30 and 32 to which the heating coil 70 is connected are mounted on the bracket 235 and an index finger 239 projecting laterally from the arm 234 registers with a temperature scale 240 on the plate 47. Otherwise, this modification is identical with the Fig. 2 control.

From the foregoing, it will be apparent that the bracket 235 may be adjusted to provide any initial tensioning of the bimetal limb 42 corresponding to a basic, maximum boiler temperature and thereafter additional tensioning and hence higher maximums are automatically provided by increased heat demands in the same manner as described for the Fig. 2 control.

Referring to Fig. 23, there is illustrated a modification of the Fig. 6 control which also eliminates the manual cam disk 60. The motor 90 is adjustably carried on the back plate 47 by means of a bracket 241 secured to the motor and having an arm 242 which includes a vertically, elongated slot 243 through which extends a screw 244 that is mounted in the plate 47. An index finger 245 attached to the arm 242 registers with a temperature scale 246. Adjustment of the bracket 241 acting through the cam 91 secures the same results as noted in connection with the Fig. 22 modification.

In Fig. 24 is illustrated a further modification of the Fig. 2 control which also eliminates the manual disk 60 and in which the heat motor 136 is employed for automatic control. This motor is mounted on the horizontal wing of an L-shaped bracket 247 whose vertical wing includes a vertically elongated slot 248 through which extends a screw 249 that is mounted in the back plate 47. The bracket 247 also carries an index finger 250 that registers with a temperature scale 251 marked on the plate 47. The ends of the heating coil 143 are connected to the terminals 30 and 32, and otherwise this control is the same as that illustrated in Fig. 2. Initial tensioning of the bimetal limb 42 is achieved by adjusting the position of the bracket 247 acting through the motor 136 which is then liquid filled and therefore unyielding, while automatic variation of this tensioning is obtained by changes in the length of the heat motor effected by increased heat demands.

I claim:

1. In a hot water heating system having a boiler for heating a space and firing means for the boiler, a U-shaped, bimetallic member immersed in the boiler water and arranged for closure and spreading of its limbs as the boiler water temperature rises and drops, respectively, a switch carried by the free end of one limb, a first electric circuit including the firing means and contact means engageable by the switch, manual means engageable with the free end of the other limb and operable to establish a selected tension in the member corresponding to a basic maximum temperature at which the switch opens, a parallel, second electric circuit including a thermostat responsive to the demand of the space for heat and a resistance, and means engageable with the last named limb and actuated by the heat emission of the resistance during closure of the thermostat for increasing the tension in the member and raising the boiler water temperature above the maximum.

2. In a hot water heating system having a boiler for heating a space and firing means for the boiler, a U-shaped, bimetallic member immersed in the boiler water and arranged for closure and spreading of its limbs as the boiler water temperature rises and drops, respectively, a switch carried by the free end of one limb, a first electric circuit including the firing means and contact means engageable by the switch, a parallel, second electric circuit including a thermostat responsive to the demand of the space for heat and a resistance, and means actuated by the heat emission of the resistance during closure of the thermostat for varying the tension in the member to vary the boiler temperature comprising a bimetal element fast at one end and free at the other end and a part responsive to movements of the free end of the element and engaging the other limb of the member.

3. In a heating system having a heat source supplying heat to a heating medium for heating a space and firing means for the source, a bimetallic member responsive to the temperature of the medium in the source and arranged to have its ends vary in position relative to each other as the temperature of the medium varies, switch means operatively related to one end of the member, a first electric circuit including the firing means and contact means engageable by the switch means, a parallel, second electric circuit including a thermostat responsive to the demand of the space for heat and a resistance, and means actuated by the heat emission of the resistance during closure of the thermostat and adapted to vary the tension in the member to thereby vary the temperature of the medium in the source comprising a bimetal element fast at one end and free at the other end and a part responsive to movements of the free end of the element and engaging an end of the member.

4. In a hot water heating system having a boiler for heating a space and firing means for the boiler, a U-shaped, bimetallic member immersed in the boiler water and arranged for closure and spreading of its limbs as the boiler water temperature rises and drops, respectively, a switch carried by the free end of one limb, a first electric circuit including the firing means and contact means engageable by the switch, means engageable with the free end of the other limb and operable to establish a selected tension in the member corresponding to a basic maximum temperature at which the switch opens, a parallel, second electric circuit including a thermostat responsive to the demand of the space for heat and a resistance, and means engageable with the other limb and actuated by the heat emission of the resistance during closure of the thermostat for varying the tension in the member to vary the boiler temperature.

5. In a heating system having a heat source supplying heat to a heating medium for heating a space and firing means for the source, a bi-metallic member responsive to the temperature of the medium in the source and arranged to have its ends vary in position relative to each other as the temperature of the medium varies, switch means operatively related to one end of the member, a first electric circuit including the firing means and contact means engageable by the switch means, means engageable with an end of the member and operable to establish a selected tension in the member corresponding to a basic maximum temperature at which the switch opens, a parallel, second electric circuit including a thermostat responsive to the demand of the space for heat and a resistance, and means actuated by the heat emission of the resistance during closure of the thermostat and adapted to vary the tension in the member to thereby vary the temperature of the medium in the source.

LAWRENCE J. SMITH.

REFERENCES CITED

The following references are of record in the file of this patent:

UNITED STATES PATENTS

| Number | Name | Date |
|---|---|---|
| 1,533,630 | Breese | Apr. 14, 1925 |
| 1,921,708 | Snavely | Aug. 8, 1933 |
| 2,140,473 | Grant | Dec. 13, 1938 |
| 2,189,381 | McGrath | Feb. 6, 1940 |
| 2,189,382 | McGrath | Feb. 6, 1940 |
| 2,208,761 | Hartig | July 23, 1940 |
| 2,256,840 | Haines | Sept. 23, 1941 |
| 2,279,025 | Nelson | Apr. 7, 1942 |
| 2,280,307 | Malone | Apr. 21, 1942 |
| 2,372,307 | Alexander | Mar. 27, 1945 |
| 2,510,481 | Sagar | June 6, 1950 |